United States Patent [19]
Hoeg et al.

[11] 4,054,293
[45] Oct. 18, 1977

[54] HYBRID MAGNETIC FLUID SHAFT SEALS

[75] Inventors: Donald F. Hoeg, Mount Prospect; John J. Tuzson, Evanston, both of Ill.

[73] Assignee: Borg-Warner Corporation, Chicago, Ill.

[21] Appl. No.: 754,195

[22] Filed: Dec. 27, 1976

[51] Int. Cl.² ............................................. F16J 15/42
[52] U.S. Cl. ...................................... 277/13; 277/80; 277/135
[58] Field of Search ..................... 277/13, 14 R, 14 B, 277/14 V, 25, 80, 135

[56] References Cited
U.S. PATENT DOCUMENTS

| | | | |
|---|---|---|---|
| 1,773,067 | 8/1930 | Ver Planck | 277/135 X |
| 2,557,140 | 6/1951 | Razdowitz | 277/135 X |
| 3,097,853 | 7/1963 | McHugh | 277/13 |
| 3,620,584 | 11/1971 | Rosensweig | 277/80X |

Primary Examiner—Robert S. Ward, Jr.
Attorney, Agent, or Firm—Richard J. Schlott

[57] ABSTRACT

An improved dynamic shaft seal particularly useful with submersible pumps employing in combination magnetic fluid seals and a centrifugal seal filled with a magnetic seal fluid, wherein the centrifugal seal provides sealing at high rotational speeds, and the magnetic seals prevent escape of fluid from the centrifugal seal chamber at low rotational speeds.

1 Claim, 2 Drawing Figures

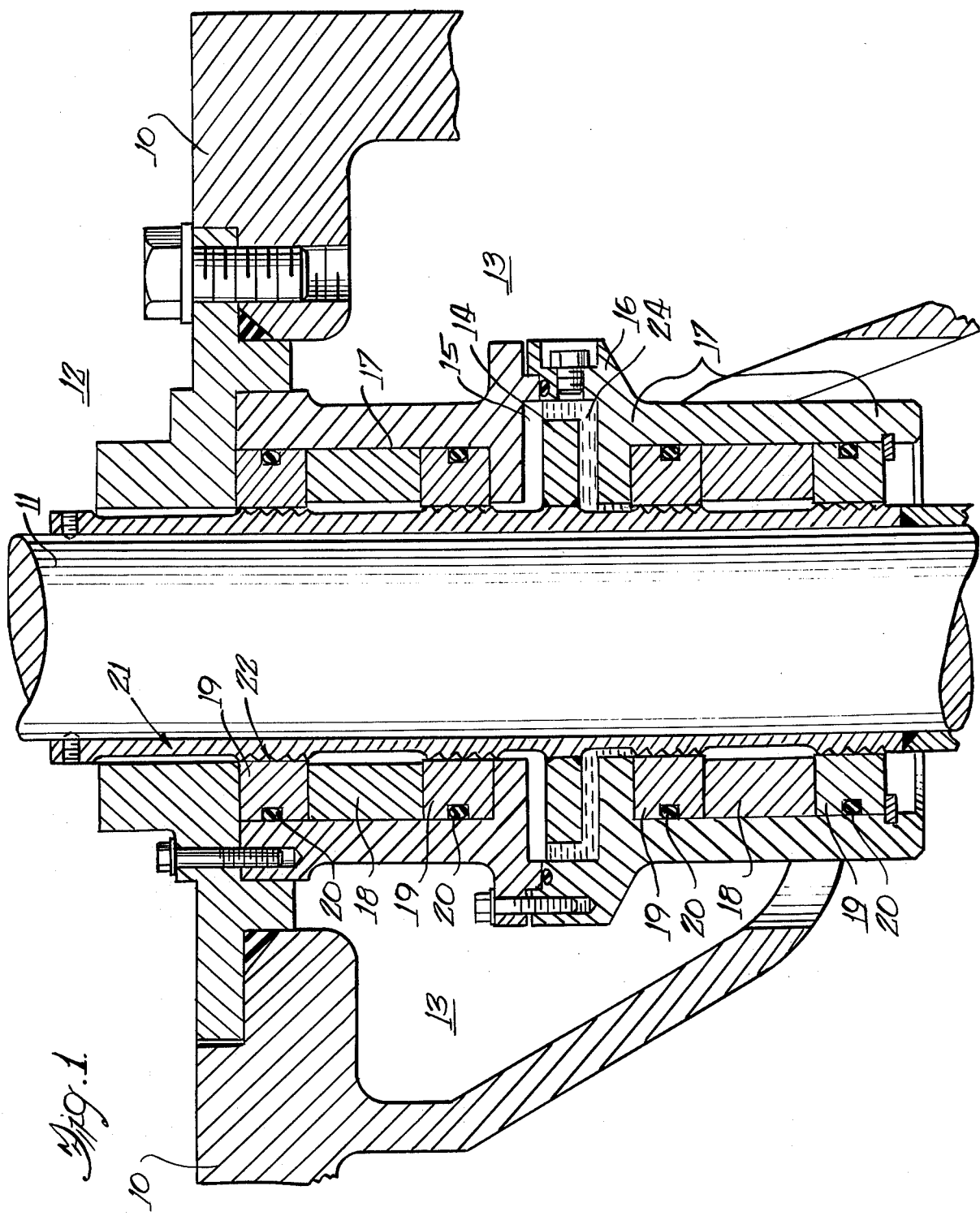

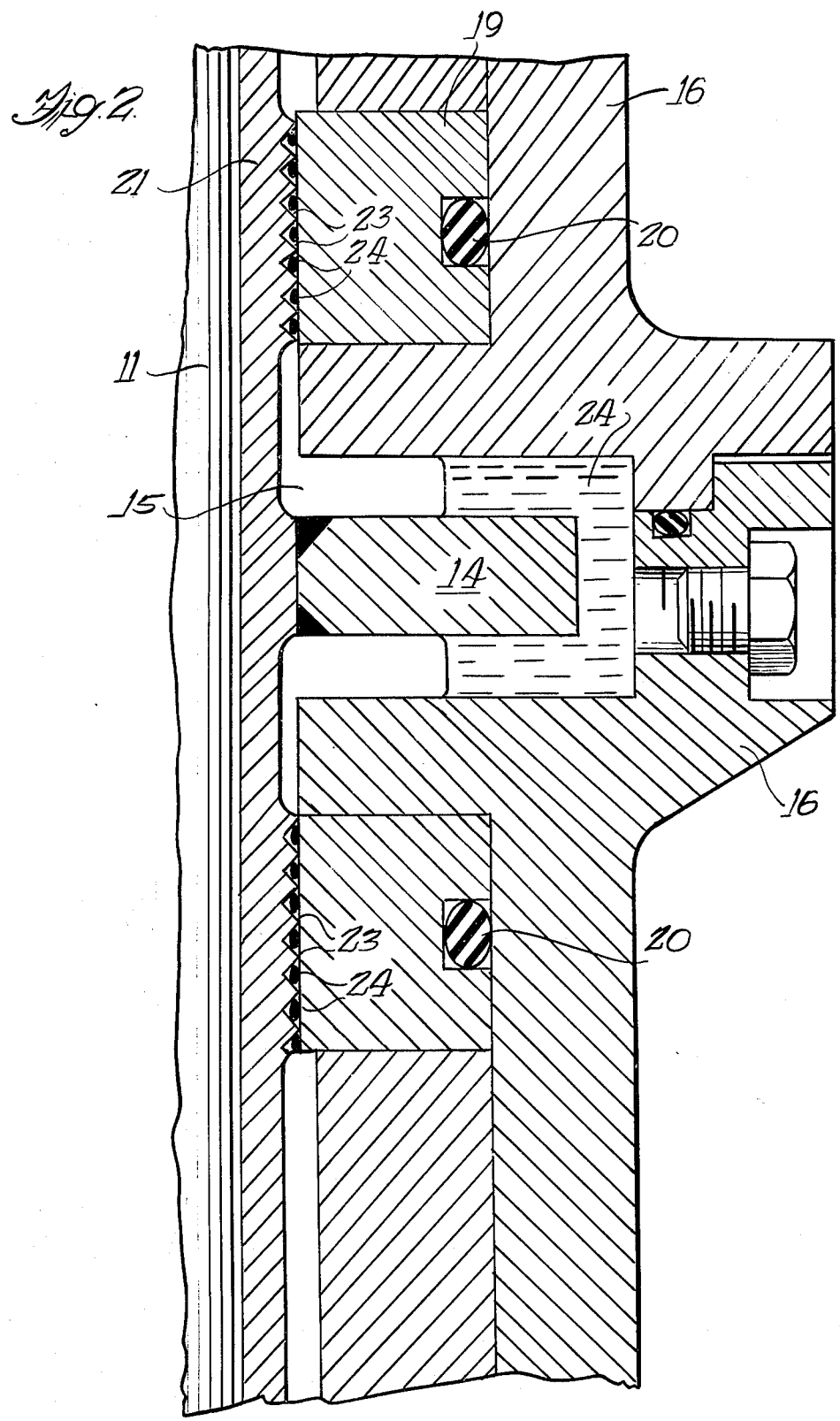

HYBRID MAGNETIC FLUID SHAFT SEALS

BACKGROUND OF THE INVENTION

This invention relates to improved dynamic shaft seals for submersible motors and more particularly to improved dynamic sealing means for sealing the motor shaft to the motor housing of a submersible pump so that there is no leakage of external or well fluids into the pump motor.

Centrifugal fluid seals are widely used between a relatively rotatable shaft and a housing having a fluid chamber surrounding an opening in which the shaft is sealed. These liquid barrier seals have the ability to provide a leakproof seal under relatively high pessure differentials and high shaft speeds with relatively low friction losses. High sealing pressures are acheived with centrifugal seals only at high rotating speeds, however, and sealing at startup and at low rotational speeds is difficult. Additionally, where employed to seal shafts which operate in a vertical position, preventing escape of seal fluid from the fluid chamber presents a major problem.

A variety of seal configurations and combination seals have been devised to provide sealing at low shaft speeds and to prevent loss of seal fluid from the seal chamber when the shaft is not rotating, particularly for use in vertical shaft appplications. In U.S. Pat. No. 2,295,579 there is shown a mercury-filled centrifugal seal for a vertical shaft employing an elaborate labyrinth to retain mercury in the seal and to maintain effective contact of the mercury with the shaft at all rotational velocities. Seals of this type suffer several disadvantages, including the requirement for complex and expensive machining of parts and the use of potentially toxic mercury.

An alternative design also employed with vertical shaft installations includes a mechanical static seal disposed axially along the shaft below the centrifugal seal, such as is shown for example in U.S. Pat. No. 2,781,209. The mechanical seal operates at zero or slow rotational speeds to retain the centrifugal seal fluid in the seal fluid chamber and to prevent leakage of seal fluid and external or pumped fluids through the shaft seal area. At high rotational speeds, where the centrifugal seal becomes effective, the mechanical seal is disengaged from contact with the shaft by centrifugal forces. As with other mechanical seals, the primary disadvantages of such combination seals are the high failure rate caused by wear when operating under extreme conditions of speed, pressure and corrosive environments, increased frictional losses due to the mechanical seal, the requirement for complex mechanical design and the need for additional machining operations.

A completely dynamic seal for use with vertical shaft installations which would be capable of sealing against large pressure differentials and which would operate to minimize or prevent loss of seal fluids at low rotational speeds and which would avoid the need for use of potentially toxic seal fluids such as mercury would be a desirable improvement over presently available dynamic seals.

BRIEF SUMMARY OF THE INVENTON

The improved dynamic seal of the present invention is designed for use with rotatable shafts of submersible pump motors and particularly for those which operate in vertical installations. The improved dynamic seal of the present invention employs in combination a centrifugal seal and magnetic fluid seals, together with a dense magnetic fluid to accomplish sealing both at high rotational shaft speeds and at low rotational shaft speeds. The magnetic seals are axially disposed along the rotatable shaft, above and below the centrifugal seal. At low rotational shaft speeds the magnetic fluid is captured by the magnetic seals, which operate to exclude the external well fluids from the motor housing, and to prevent escape of the magnetic fluid from the centrifugal seal. At high rotational speeds, a portion of the dense magnetic fluid is thrown into centrifugal seal chamber under intense centrifugal forces to provide an effective seal which will resist a large pressure differential between the internal motor fluids and the external well fluids thus preventing penetration of well fluids into the motor.

BRIEF DESCRIPTION OF THE DRAWINGS

FIG. 1 is a cross-sectional view of a dynamic shaft seal constructed in accordance with the principles of this invention.

FIG. 2 is an enlarged sectional view of a portion of FIG. 1, including the centrifugal seal and a portion of the two magnetic seals and showing the location of the magnetic fluid during high speed operation.

DESCRIPTION OF THE PREFERRED EMBODIMENTS

Referring now to the drawings, in FIG. 1 is shown a shaft seal constructed according to the principles of this invention included in the housing 10 of a submersible electric motor. Motor shaft 11 is driven by the electric motor (not shown) and passes from the motor housing through the seal and into the outer environment 12. The voids 13 within motor housing 10 are filled with oil which may be at the same, greater or lower pressure relative to that of the well fluids occupying outer environment 12. The seal includes a centrifugal seal which in the present embodiment comprises flange 14 secured to the shaft 11 and fluid chamber 15 defined by the surrounding seal housing 16. Axially along the shaft above and below the centrifugal seal are magnetic fluid seals 17. The magnetic seals of the present embodiment are of conventional design, comprising permanent ring magnets 18 and pole pieces 19. The pole pieces have static seals 20 located on the outer peripheral surfaces. These static seals or O rings engage the inner peripheral wall of the seal housing 16 in a fluid-tight manner. An inner bushing 21, secured to shaft 11, has knife edges 22 spaced apart from the pole pieces 19 to define gaps 23. A magnetic fluid 24 is held within the gaps by the magnetic flux which passes through the pole pieces, across the gap and through the magnetizable bushing 21. The operation and alternate embodiments for magnetic fluid seals are described and disclosed in U.S. Pat. No. 3,620,584. Contained within the fluid chamber 15 is a magnetic fluid 24. The location of the fluid within the chamber 15 will depend whether the shaft 11 is in rotaton or at rest, and is shown in FIG. 1 in the at-rest condition for purposes of illustration.

Turning now to FIG. 2, there is shown a portion of the seal including the centrifugal seal flange 14, fluid chamber 15 and the adjacent pole pieces 19 of the upper and lower magnetic seals, wherein the shaft is operating at high rotational speeds and further showing the location of the magnetic fluid 24 in seal chamber 15 during high speed operation.

Any type of magnetic fluid may be used including those magnetic fluids which comprise a carrier fluid such as water, hydrocarbons, fluorocarbons and the like, a surface active agent such as a fatty acid including for example, oleic acid, stearic acid and the like, and any magnetic type particles including for example ferrous materials such as ferrite, chromuim dioxide, magnetite and the like. Inasmuch as the capacity of the centrifugal seal to seal effectively against large pressure differentials will depend in part upon the density of the seal fluid, seal fluids having the higher densities will be preferred, and for applications in wells where the fluid being pumped is water, seal fluids employing as the carrier fluid a liquid immiscible with water and having a room temperature density greater than 1 will be particlarly preferred.

It will clearly be seen that during high speed operation the magnetic fluid, urged by flange 14, will be thrown undr high centrifugal forces to the oute periphery of the centrifugal seal, as shown in FIG. 2, operating as an effective dynamic seal in the conventional manner. At lower rotational speeds, when the magnetic fluid is no longer subjected to great centrifugal forces imparted by the rotating flange 14 of the centrifugal seal the magnetic fluid will fall to the lower portion of the fluid chamber 15 and be held within the seal area by the magnetic seals, as shown in FIG. 1. Escape of fluid from the seal is thus prevented.

The instant combination of magnetic and centrifugal seals also provides protection against invasion of the motor housing by external well fluids. Should fluid pressures in the external environment 12 exceed the sealing capability of the upper magnetic seal, well fluids would pass through the upper magnetic seal and enter the fluid chamber 15. At high rotational speeds, FIG. 2, the well fluids would be prevented from passing into the motor housing by the seal fluid. At low rotational speeds and at rest, FIG. 1, the immiscible magnetic fluid would return to the lower magnetic seal, and being the more dense, would form an effective liquid barrier to prevent well fluids from contacting the motor oil or invading the motor. Upon increasing the rotatonal speed, the centrifugal seal would be re-established. The more dense magnetic fluid would be thrown into the fluid chamber as before and the well fluid would thus be displaced upwardly out of the seal chamber 15 by the advancing magnetic fluid.

The dynamic shaft seal of the instant invention thus provides an effective means for sealing a rotatable motor shaft to the motor housing of a submersible pump motor and will be particularly effective and useful for sealing shafts in a vertical installation. It will be understood that the seals of this invention will be operable and non-leaking in all positions including inverted positions, inasmuch as the seaing properties of the magnetic seal portions are not unidirectional. The dynamic seals of this invention when included in submersible pump motors and the like thus provide the added advantage of being transportable when filled, unlike most conventional mercury seals which must be transported empty and filled immediately prior to installation in order to prevent loss of fluid from the seal.

While the invention has been described in connection with a single specific embodiment thereof, it is to be understood that this is by way of illustration and not by way of limitation, and the scope of the appended claims should be construed as broadly as the prior art will permit.

We claim:

1. In a device having a stationary housing, a vertical shaft rotatably mounted in said housing, dynamic seal means including said housing for sealing said shaft to said housing, said seal means comprising a plurality of spaced groups of knife edges on said shaft; an annular flange on said shaft interposed between said spaced groups of knife edges; said housing including means defining first and second chambers for receiving magnets and a third chamber for receiving the annular flange; magnet means disposed within said first and second chambers in surrounding relationship to said spaced groups of knife edges and radially spaced therefrom to define spaces therebetween; and magnetic fluid captured in said spaces and partially filling said third chamber to provide liquid sealing between said housing and said shaft.

* * * * *